United States Patent
Wang et al.

(10) Patent No.: US 7,383,273 B2
(45) Date of Patent: Jun. 3, 2008

(54) SYSTEM AND METHOD FOR MANAGING OBJECT TO RELATIONAL ONE-TO-MANY MAPPING

(75) Inventors: Yaoping Wang, Ottawa (CA); James Bryce Sutherland, Ottawa (CA)

(73) Assignee: Oracle International Corporation, Redwood Shores, CA (US)

( * ) Notice: Subject to any disclaimer, the term of this patent is extended or adjusted under 35 U.S.C. 154(b) by 512 days.

(21) Appl. No.: 11/062,014

(22) Filed: Feb. 18, 2005

(65) Prior Publication Data

US 2005/0149555 A1 Jul. 7, 2005

Related U.S. Application Data

(63) Continuation of application No. 09/920,789, filed on Aug. 1, 2001, now Pat. No. 6,907,433.

(51) Int. Cl.
*G06F 17/00* (2006.01)
(52) U.S. Cl. ............... 707/101; 707/103 R; 707/104.1
(58) Field of Classification Search ............. 707/101, 707/103 R, 104.1
See application file for complete search history.

(56) References Cited

U.S. PATENT DOCUMENTS

| | | | | |
|---|---|---|---|---|
| 5,499,371 | A | * | 3/1996 | Henninger et al. ......... 707/102 |
| 5,560,014 | A | * | 9/1996 | Imamura ..................... 717/108 |
| 5,615,362 | A | | 3/1997 | Jensen et al. ............... 395/614 |
| 5,706,506 | A | | 1/1998 | Jensen et al. ............... 395/614 |
| 5,799,309 | A | * | 8/1998 | Srinivasan .................. 707/102 |
| 6,078,926 | A | | 6/2000 | Jensen et al. ............... 707/103 |
| 6,101,502 | A | | 8/2000 | Heubner et al. ............ 707/103 |
| 6,385,618 | B1 | * | 5/2002 | Ng et al. ................ 707/103 Y |
| 6,631,519 | B1 | * | 10/2003 | Nicholson et al. .......... 717/169 |

* cited by examiner

*Primary Examiner*—Joon Hwan Hwang
(74) *Attorney, Agent, or Firm*—Park, Vaughan & Fleming LLP

(57) ABSTRACT

Instructions are generated to manipulate target objects and relationships in a relational database when a source object having a one-to-many relationship of privately owned type with the target objects is manipulated. To generate instructions, mapping meta-data is used which contains information as to how object classes of the object model map to tables in the database and how relationships map to foreign keys.

17 Claims, 6 Drawing Sheets

SYSTEM AND METHOD FOR MANAGING OBJECT TO RELATIONAL ONE-TO-MANY MAPPING

This application is a continuation of, and hereby claims priority under 35 U.S.C. §120 to, a U.S. patent application entitled, "System and Method for Managing Object to Relational One-To-Many Mapping," by inventors Yaoping Wang and James Bryce Sutherland, Ser. No. 09/920,789, filed Aug. 1, 2001 now U.S. Pat. No. 6,907,433.

This invention relates to a system and method for managing object to relational mapping, and more particularly, to a system and method for managing mapping of objects having one-to-many relationships.

BACKGROUND OF THE INVENTION

Object model technology is becoming more popular for building enterprise applications. However, many organizations have already developed relational databases and have their corporate data stored in those databases. Accordingly, it is desirable to provide a mechanism to allow object applications to manipulate objects in relational databases, i.e., write, read, delete and update objects in or from the relational databases. Object-oriented applications are built using object models with inheritance and relationships, whereas relational databases consist of flat tables and foreign keys. It is desired to be able to represent the raw database data as application objects. Databases are queried through a database query language, such as Structured Query Language (SQL), however it is desirable to query object model at the object level and through traversing the object model.

In an object model, for a one-to-many relationship, the source object holds the references to the target objects. This is opposite to a relational database, where the target of the one-to-many relationship stores a foreign key to the source entity. It is desirable to represent a one-to-many relationship in the object model without having the target object have any knowledge, relationship to or foreign key information of the source object. The problem is that this information is required to store the target object into the relational database.

In order to store target objects into the relational database, an existing solution provides the target object in an object model with a many-to-one relationship back to the source object. The shortcomings of having a many-to-one relationship back to the source object is that the target object must have knowledge of the source object. This is intrusive of the object design and prevents other objects in the object model from sharing references to the same target object's class.

Another existing solution provides the target object in an object model with a direct attribute to store the foreign key to the source object. The shortcomings of having a direct attribute to store the foreign key to the source object is that the target.

Another existing solution provides the target object in an object model with a direct attribute to store the foreign key to the source object. The shortcomings of having a direct attribute to store the foreign key to the source object is that the target object must have knowledge of the source object. This is again intrusive of the object design. In this solution, the foreign key attribute must also be maintained by the application's code.

It is therefore desirable to provide a system and method which allow object to relational one-to-many mapping without providing back-reference or direct attributes in the target objects.

SUMMARY OF THE INVENTION

It is an object of the invention to provide a novel system and method for managing object to relational one-to-many mapping that obviates or mitigates at least one of the disadvantages of existing systems.

The present invention generates instructions to manipulate target objects and relationships in a relational database when a source object having a one-to-many relationship of privately owned type with the target objects is manipulated. To generate instructions, it uses mapping meta-data which contains information as to how object classes of the object model map to tables in the database and how relationships map to foreign keys.

In accordance with an aspect of the present invention, there is provided a method for managing object to relational one-to-many mapping for an object model mapped to a relational database. The method comprises steps of obtaining, for a source object having a primary key value and being manipulated in a corresponding source table of the relational database, mapping meta-data including information of a corresponding target table for storing at least target object with which the source object has a one-to-many relationship of privately owned type and information of a foreign key of the corresponding target table; generating an instruction to manipulate the at least one target object in the corresponding target table based on the mapping meta-data; and manipulating the at least one target object in the database by executing the instruction on the database.

In accordance with another aspect of the present invention, there is provided a method for managing object to relational one-to-many mapping for an object model mapped to a relational database. The method comprises steps of obtaining, for a source object having a primary key value and being inserted in a corresponding source table of the relational database, mapping meta-data including information of a corresponding target table for storing at least one target object with which the source object has a one-to-many relationship of privately owned type and information of a foreign key of the corresponding target table; generating an insert instruction to add a value of the foreign key based on the primary key value of the source object, and to insert the at least one target object into the corresponding target table based on the mapping meta-data; and inserting the at least one target object into the database by executing the insert instruction on the database.

In accordance with another aspect of the present invention, there is provided a method for managing object to relational one-to-many mapping for an object model mapped to a relational database. The method comprises steps of obtaining, when a source object having a primary key value is being read from a source table in the relational database, mapping meta-data including information of one or more corresponding target tables and information of one or more foreign keys of the corresponding target tables; generating a select instruction to select from the target tables target objects with which the source object has one-to-many relationships of privately owned type, based on the mapping meta-data and the primary key value of the source object;

and reading the target objects and relationships relating to the source object from the database by executing the select instruction on the database.

In accordance with another aspect of the present invention, there is provided a method for managing object to relational one-to-many mapping for an object model mapped to a relational database. The method comprises steps of obtaining, when a source object having a primary key value is being deleted from a source table in the relational database; mapping meta-data that defines one or more corresponding target tables storing target objects with which the source object has one-to-many relationships of privately owned type and foreign key information; generating a delete instruction to delete the target objects from the target tables based on the mapping meta-data; and deleting the target objects by executing the delete instruction on the database.

In accordance with another aspect of the present invention, there is provided a method for managing object to relational one-to-many mapping for an object model mapped to a relational database. The method comprises a step of tracking changes to relationships and target objects with which the source object has one-to-many relationships of privately owned type, wherein the tracking step comprises steps of creating, at the start of a transaction, a source clone of a source object having a primary key value, a relationship clone of a relationship in the source object, and a target clone of target objects referenced by the relationship; and determining, when the transaction is committed, changes to the source object and target objects by comparing the source clone to the current state of the source object, and comparing the target clone to the current state of the target objects using the primary key value of the source object added to the target objects.

In accordance with another aspect of the present invention, there is provided a one-to-many mapping manager for managing object to relational one-to-many mapping for an object model mapped to a relational database. The system comprises a meta-data receiver for obtaining, for a source data having a primary key value and being manipulated, mapping meta-data including information of one or more corresponding target tables for storing multiple target objects with which the source object has one-to-many relationships of privately owned type and information of one or more foreign keys of the corresponding target tables; an instruction generator for generating instructions to manage the multiple target objects and the relationship based on the mapping meta-data; and an instruction executor for executing the instructions on the database and managing the target objects and the relationship in the database in accordance with the manipulation of the source object.

In accordance with another aspect of the present invention, there is provided a mapping system for managing an object model to a relational database. The object model contains object classes having one or more source objects and target objects having one-to-many relationships of privately owned type with the source objects. The database has tables including one or more source tables for storing the source objects and one or more target tables for storing the target objects. The source tables have primary keys and the target tables have foreign keys. The system comprises a mapping tool for assisting in mapping object classes to tables and mapping relationships to foreign keys; a meta-data storage for storing mapping meta-data defining information of how object classes map to tables and information of how relationships map to foreign keys, the mapping meta-data including information of one or more corresponding target tables for storing the multiple target objects and information of one or more foreign keys of the corresponding target tables; and a runtime mapping library for accessing the mapping meta-data in the meta-data storage and managing object data in the database, the runtime mapping library having a one-to-may mapping manager for managing one-to-many relationships and target objects with which a source objects have one-to-many relationships in accordance with the manipulation of the source object.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

One-to-many relationships can be composed into two groups, privately owned and independent. A privately owned relationship is one in which the target object is a dependent part of the source object and cannot exist on its own without the source object. The present invention handles the object to relational persistence of one-to-many relationships that are part of privately-owned group.

Figure 1:
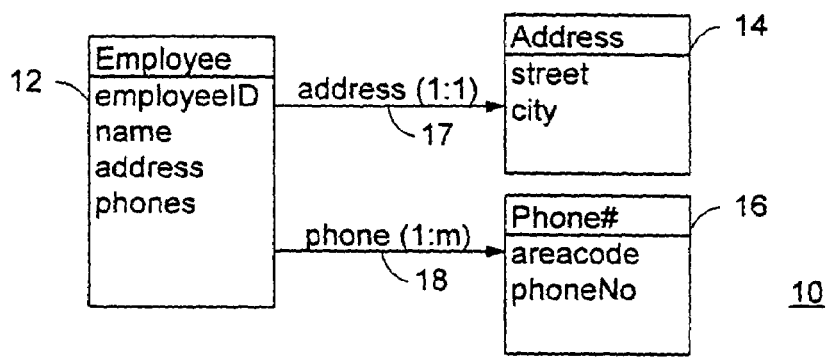
FIG. 1 is a diagram showing an example of an object model having a one-to-many relationship.

FIG. 1 shows an example of an object model 10. The object model 10 contains three object classes, Employee 12, Address 14 and Phone# 16. Employee 12 has a primary key employeeID. Employee 12 has an address attribute, the value of which references to an address object in Address 14. Thus, Employee 12 and Address 14 have a one-to-one relationship. Phone# 16 contains phone numbers. A single employee in Employee 12 may have one or more phone numbers. Thus, Employee 12 and Phone# 14 have a one-to-many relationship. In this example, objects in Employee 12 are source objects and target objects of the source objects are those in Phone# 14. The information referencing this one-to-many relationship is provided in source objects in Employee 12 as shown in arrow 18. The target objects in Phone# 14 do not have any knowledge, relationship to or foreign key information of their corresponding source object in Employee 12.

Target objects in Phone# 14 are a dependent part of the source object in Employee 12 and cannot exist without the source objects. Thus, Phone# is privately owned by Employee 12.

Figure 2:
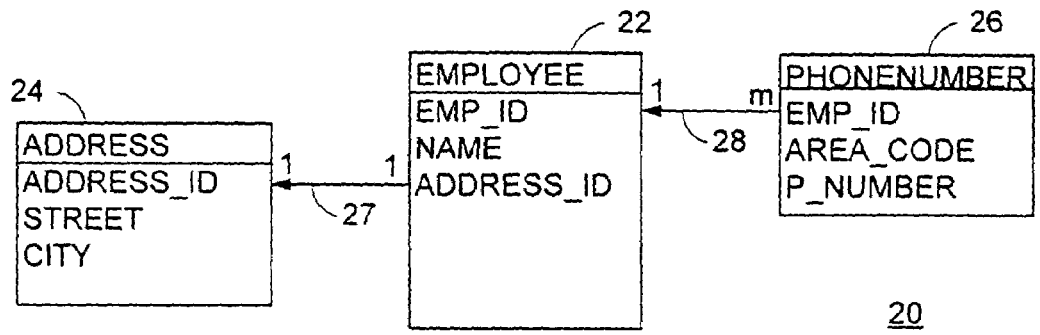
FIG. 2 is a diagram showing an example of a relational database having a one-to-many relationship.

FIG. 2 shows an example of a relational database 20 to which the object model 10 maps. The database 20 contains three tables: EMPLOYEE 22, ADDRESS 24 and PHONE-NUMBER 26. EMPLOYEE 22 has a primary key EMP_ID. PHONENUMBER 26 has EMP_ID as a foreign key. As shown with arrow 28, the foreign key in the target table stores the one-to-many relationships between EMPLOYEE 22 and PHONENUMBER 26.

Figure 3B:
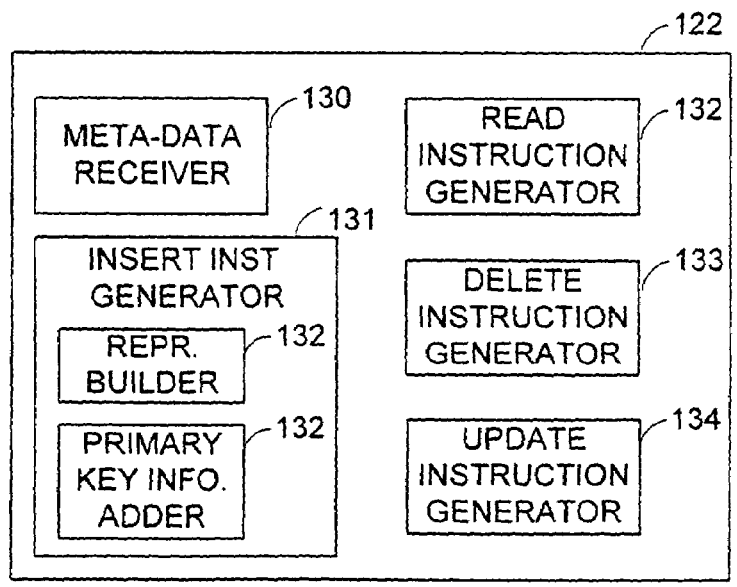
FIG. 3B is a block diagram showing an example of the instruction generator.
Figure 3A:
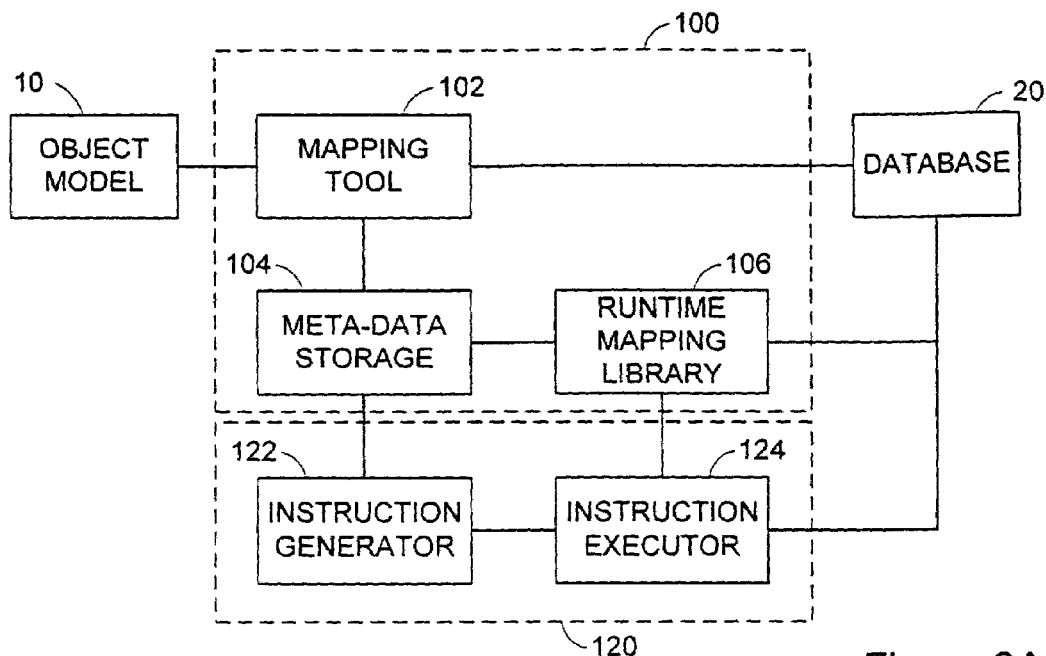
FIG. 3A is a block diagram showing a mapping system in accordance with an embodiment of the present invention.

FIG. 3A shows an example of an object to relational mapping system 100 to which a one-to-many mapping manager 120 in accordance with an embodiment of the present invention is suitably applied. The mapping system 100 contains a class mapping tool 102, a meta-data storage 104 and a runtime mapping library 106.

The class mapping tool 102 is a development-time tool that assists developers of the database schema in defining how an object model maps to a relational database. For example, using this tool 102, a developer maps the three object classes, Employee 12, Address 14 and Phone# 16, of object model 10 shown in FIG. 1 to three tables, EMPLOYEE 22, ADDRESS 24 and PHONENUMBER 26 in relational database 20 shown in FIG. 2, respectively. Also, the relationships 17, 18 between the object classes are mapped to foreign keys 27, 28, respectively. A graphical tool having a graphical user interface may be suitably used as the class mapping tool 102.

The meta-data storage 104 stores mapping meta-data defining the mapping data of how the object classes map to the tables, and how the relationships map to the foreign keys. The mapping meta-data comprises descriptors and mappings. A descriptor is a set of properties and mappings that describes how an object data is represented in a relational database. The descriptor contains mappings from the class attributes to the table columns, as well as the transformation routines necessary for storing and retrieving attributes. The descriptor acts as the link between the object model and the database representation. A mapping accomplishes the storage and retrieval of an object's attributes in and from the database representation.

The mapping meta-data may be stored in eXtended Markup Language (XML) files. The XML files are read in at runtime by the mapping manager 120 as further described below. The mapping meta-data is generally generated by the mapping tool 102. However, it may be specified through manually editing the XML file, or through Application Programming Interface (API) code. The meta-data storage 104 provided is external to both the source object classes and target object classes. Thus, there is no need to store additional information in the object classes.

The runtime mapping library 106 is a library storing a set of pre-defined generic mapping methods. The methods are defined such that they are executable on the database in terms of the object model, rather than the relational model. The runtime mapping library 106 executes the mapping methods on the database using the mapping meta-data to store or retrieve objects in or from the database. This allows users to use the mapping system 100 without knowledge of database access API's or database querying languages, such as Structured Query Language (SQL). Users may handle data in the database 20 at the object level using an object-based language, such as the Java (TM) programming language.

The one-to-many mapping manager 120 is a runtime component to dynamically manage the objects having one-to-many relationships. It comprises an instruction generator 122 and an instruction executor 124. The instruction generator 122 uses the mapping meta-data from the meta-data storage 104 at runtime to dynamically generate instructions to persist the objects. The instruction executor 124 executes the instructions on the database.

In FIG. 3A, the one-to-many mapping manager 120 is shown separately from the components of the mapping system 100. However, the components of the mapping manager 120 may be combined with or made as a part of a component of the mapping system 100. For example, the mapping manager 120 may be a part of the runtime mapping library 106 which also manages objects with other relationships such as one-to-one or many-to-many relationships.

When a source object having a one-to-many relationship with multiple target objects is manipulated, the mapping manager 120 manages the target objects and the relationship. That is, when a source object is inserted into the database, the mapping manager 120 inserts the relationship and target objects to the database. When a source object is read from the database, the mapping manager 120 reads the relationship and the target objects from the database. When a source object is deleted from the database, the mapping manager 120 deletes the relationship and target object from the database. When a source object is changed in the database, the mapping manager 120 tracks changes to the relationship and the target objects and updates them to the database. These functions are further described in more detail below.

As shown in FIG. 3A, the instruction generator 124 may have a meta-data receiver 130, an insert instruction generator 131, a read instruction generator 132, a delete instruction generator 133 and an update instruction generator 134. The insert instruction generator 131 generates insert instructions when a source object is inserted into the database 20. The read instruction generator 132 generates read instructions when a source object is read from the database 20. The delete instruction generator 133 generates delete instructions when a source object is deleted from the database 20. The update instruction generator 134 generates update instructions when a source object is changed in the database 20. The insert instruction generator 131 may have a representation builder 136 for building representation of a target object, and a primary key information adder 137 for adding a primary key information to the representation of a target object, as further described below.

Figure 4:
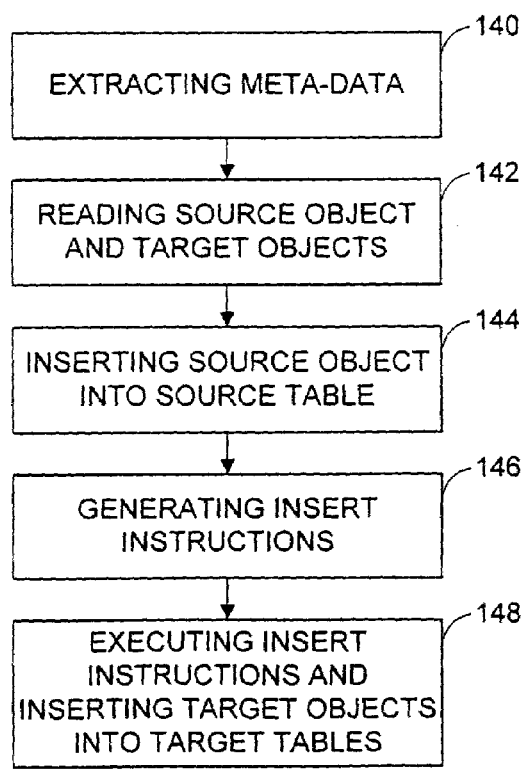
FIG. 4 is a flowchart showing an insert method in accordance with an embodiment of the present invention.

FIG. 4 shows a flowchart showing the insertion of target objects and relationships to the database in accordance with an embodiment of the invention. The target objects will be inserted in the context of the source object, i.e., using the features of the privately owned relationship between the source object and the target objects.

The mapping manager 120 reads mapping meta-data from the meta-data storage 104 (140). The mapping meta-data may be read on every read request, periodically or any time as desired. It is however typically read once when the mapping system 100 is initialized. The mapping meta-data includes mapping information relating to a source object of interest and its multiple target objects with which the source object has a one-to-many relationship. That is, the retrieved mapping meta-data includes information of a corresponding source table for storing the source object, one or more corresponding target tables for storing the multiple target objects, and information of a foreign key of each corresponding target table.

The mapping manager 120 reads, from the object model, a source object and multiple target objects with which the source object has a one-to-many relationship (142).

When the source object is inserted into the corresponding source table (144), the mapping manager 120 generates insert instructions based on the mapping meta-data (146). The insert instructions cause values of the foreign key to be added based on the primary key of the source object, and causes the multiple target objects to be inserted into the corresponding target tables based on the mapping meta-data. The mapping manger 120 executes the insert instructions on the database and inserts the target objects into the target tables together with the foreign key values (148). Thus, the actual values for the foreign keys are passed down from the primary key value of the source object in which context the target objects are written.

Figure 5:
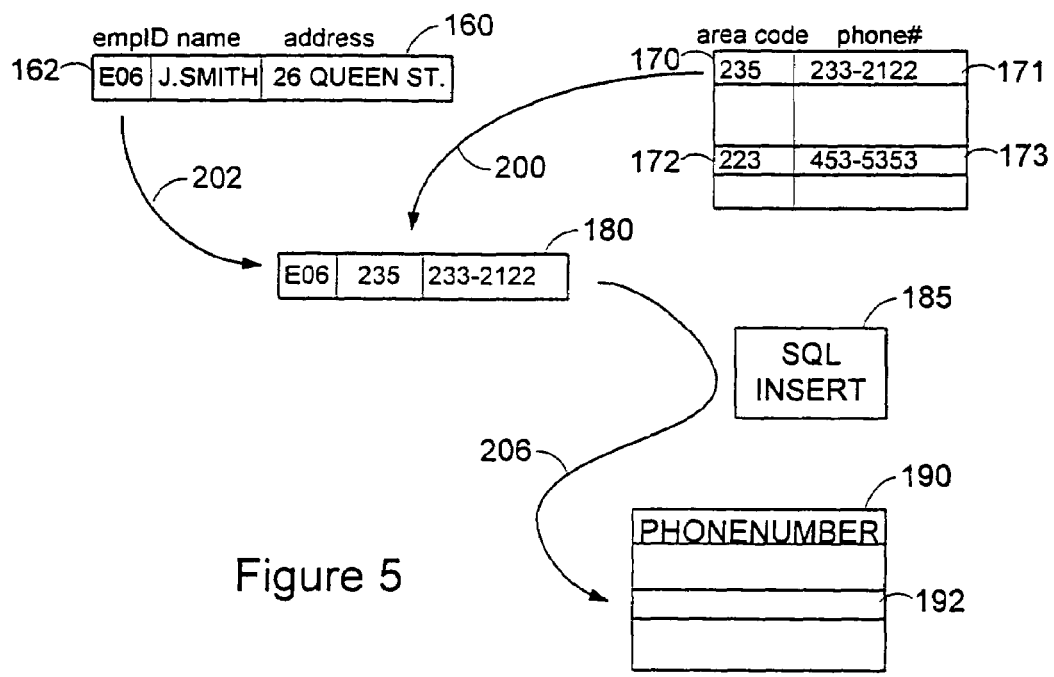
FIG. 5 is a diagram showing an example of inserting objects.

The generation of the insert instructions (146) and the execution of the insert instructions (148) may be carried out by iterating over the target objects in the context of the source object. The iteration is further described referring to FIG. 6 using an example shown in FIG. 5. In this example, a source object 160 references to two target objects 170 and 172. The source object 160 has a source key value 162. Target objects 170 and 172 contain target object data 171, 173, respectively.

The mapping manager 120 builds in memory a database row representation 180 of the first target object 170 (200). The database row representation 180 contains the target object data 170. This is only a temporary structure to store the target object data 170 for the generation and execution of the insert instruction. The representation 180 may be a Hashtable/Map-like structure. The mapping manager 120 adds the primary key value 162 of the source object 160 to the database row representation 180 (202). The primary key value 162 is added as a foreign key value of the target object.

The mapping manager 120 then generates an insert instruction based on row data for the target object (204). The row data includes the database row representation containing the target object data and the foreign key value, and the mapping meta-data obtained from the meta-data storage 104. The mapping meta-data specifies a target table 190 in which the target object is to be stored. As an insert instruction, an SQL Insert statement may be generated.

The mapping manager 120 executes the insert instruction on the database, and inserts the target object in a row 192 of the target table 190 (206). Steps 200 to 206 are repeated for each of other target objects (208).

Figure 6:
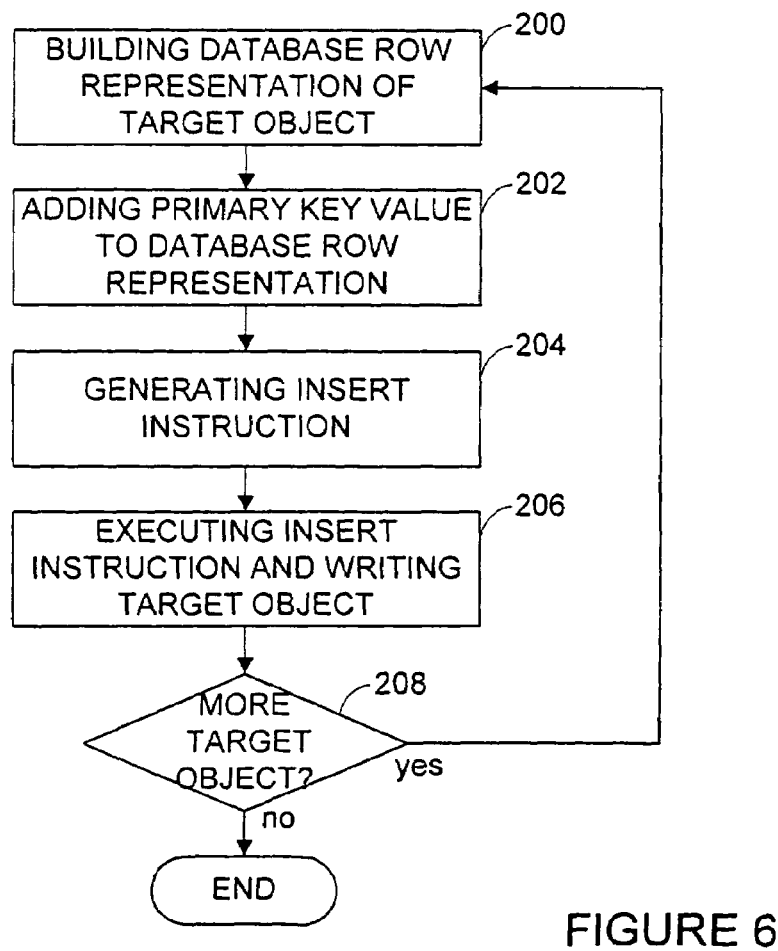
FIG. 6 is a flowchart showing an example of the insert method.

By applying the steps shown in FIGS. 4 and 6 to all objects having one-to-many relationships, the initial foreign key values for a row in the database are populated together with the target object data for all target objects. Therefore, the target objects can be inserted into target tables without providing any back references in the target objects.

Figure 7:
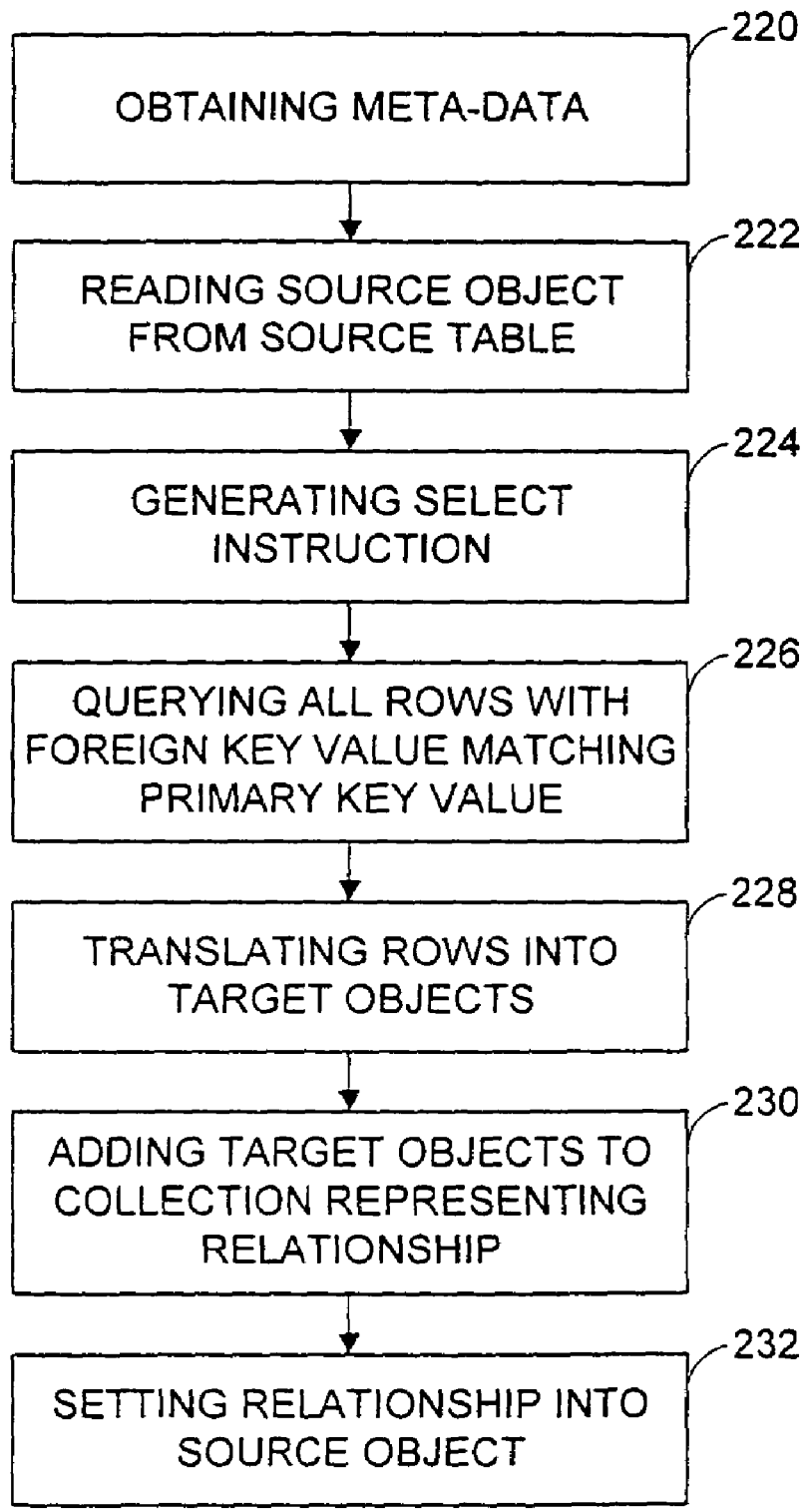
FIG. 7 is a flowchart showing a read method for reading objects.

Referring to FIG. 7, reading the relationship and target objects from the database is now described.

The mapping manager 120 uses mapping meta-data relating to the source object from the meta-data storage 104 (220). The mapping meta-data is typically read from the meta-data storage 104 when the mapping system 100 is initialized or any other time as desired, as described above. The source object has a primary key value. The retrieved mapping meta-data includes information about one or more corresponding target tables which store target objects of the source object, and information about the foreign key of each target table.

When the source object is read from the source table (222), the mapping manager 120 generates a select instruction 224 based on the mapping meta-data to select the target objects from the target tables (224). The mapping manager 120 executes the select instruction 224 on the database. The select instruction queries for all rows in the corresponding target tables that have a foreign key value matching the primary key value of the source object (226).

The select instruction 224 may be a SQL Select statement. The SQL Select statement may have a "select" clause and "where" clause. The foreign key values are not required in the target objects. The "select" clause does not include the foreign key field from each corresponding target table. It contains only the other relevant fields in each corresponding target table, whose data make up the target object data. The SQL Select statement checks the foreign key fields in the "where" clause to determine the primary key value matching.

The mapping manager 120 then translates the rows selected from the corresponding target tables into the target objects through using the mapping meta-data (228). This translation is carried out using the runtime mapping library 106. The runtime mapping library 106 has a mechanism called "reflection". The reflection, using the mapping meta-data, instantiates the instance from the descriptor's class, and iterates over the descriptor's mappings to allow each mapping to set/load/transform its data into the target object. The reflection is non-intrusive to the object model.

The mapping manager 120 then adds the target objects to a collection that represents the value of the relationship of the source object (230). When all target objects are added to the collection, the mapping manager 120 sets the relationship value into the source object (232).

According to this method, the target objects are not required to store their complete primary key values. This is because part of their primary key may have been composed of the foreign key values. Because the target objects are privately owned by the source object, the target objects share their parent source object's primary key values. The target objects however store the additional part of their primary key values. This means that the target objects may only be uniquely identified in the context of their parent source object. If an object cache were being maintained, the target objects would not be directly cached, as they have no unique identity. They would be cached in the content of their owner, i.e., source object.

Figure 8:
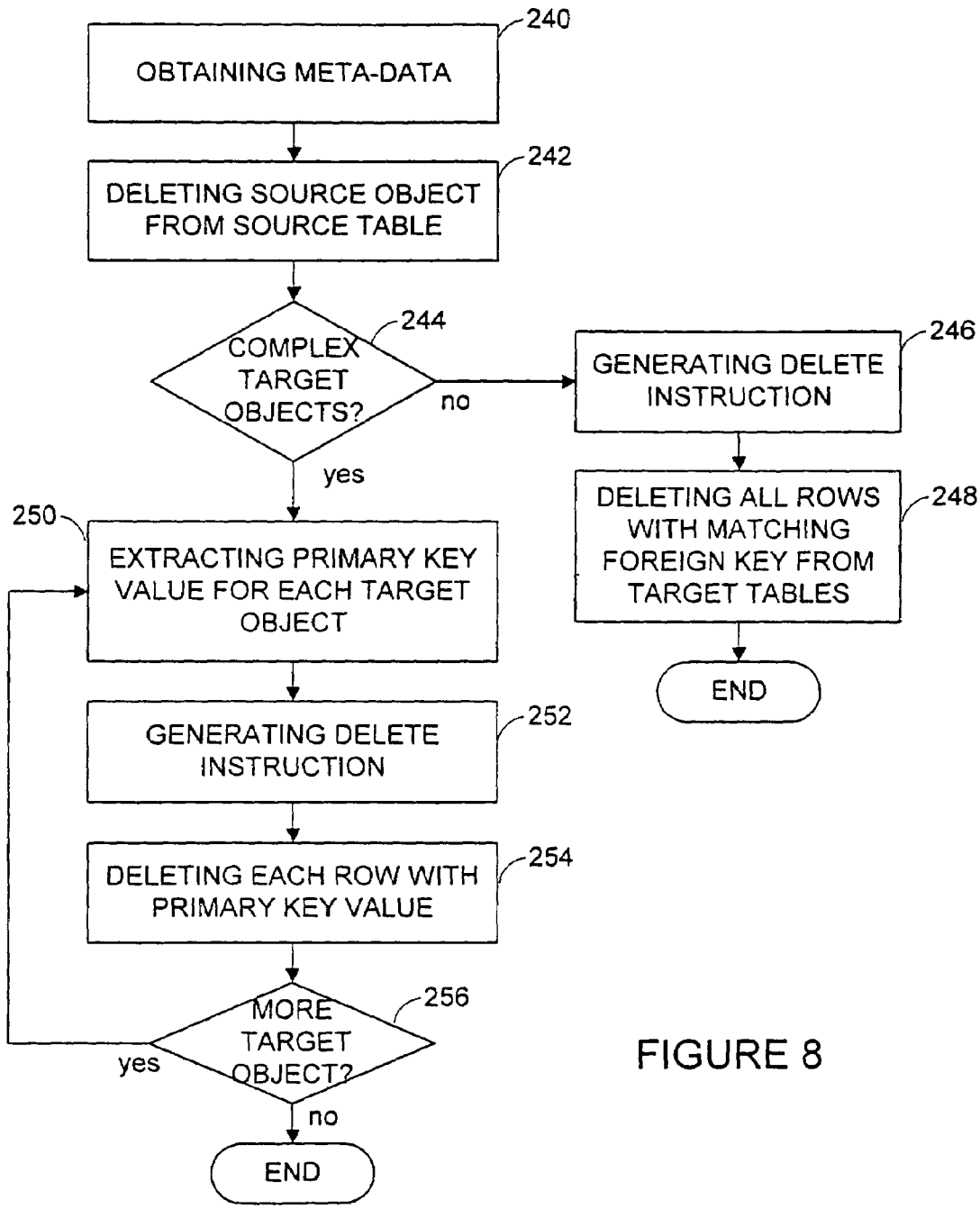
FIG. 8 is a flowchart showing a delete method for deleting objects.

Referring to FIG. 8, deleting the relationship and target objects from the database is now described.

When a source object is deleted from the database, the corresponding relationship and target objects are to be deleted. The source object in the database does not contain any reference to the target objects in the database. In order to delete the target objects in the database, the mapping manager 120 uses the mapping meta-data relating to the source object obtained from the meta-data storage 104 typically when the mapping system 100 is initialized or any other time as desired (240).

When a source object is deleted (242), the mapping system 100 determines whether the target objects are complex (244). The target objects are considered complex if they map to multiple tables.

If the target objects are not complex, the mapping manager 120 generates a single delete instruction based on the mapping meta-data (246). The mapping manager 120 executes on the database the delete instruction that deletes all rows from the target table that have a foreign key value matching the primary key value of the source object (248).

If the target objects are complex (244), the mapping manager 120 iterates over the target objects in the context of the source object to delete them one by one as joins between the source table and target tables representing the one-to-many relationships are typically not usable in delete statements in the database. That is, for each target object, the mapping manager 120 extracts a primary key value of the target object's row in the target table (250) as the primary key of the target object's row may contain data that is not in the target object. To build the complete primary key value, it may be required to add the source object's primary key valued as typically the target object primary key is composed of the source object primary key, i.e., the target object foreign key, and another field or value unique in the context of the source object. For example, for a table DEPARTMENT having a one-to-many relationship to a table EMPLOYEE, the complete primary key value may be the employee id and the foreign key value of the EMPLOYEE to the DEPARTMENT.

The mapping manager 120 then generates a delete instruction to delete the target object's row with the primary key values (252). The delete instruction may be a SQL Delete statement. The mapping manager 120 executes the delete instruction on the database to delete the row with the primary key value (254). Steps 250-254 are repeated for all target object (256).

Figure 9:
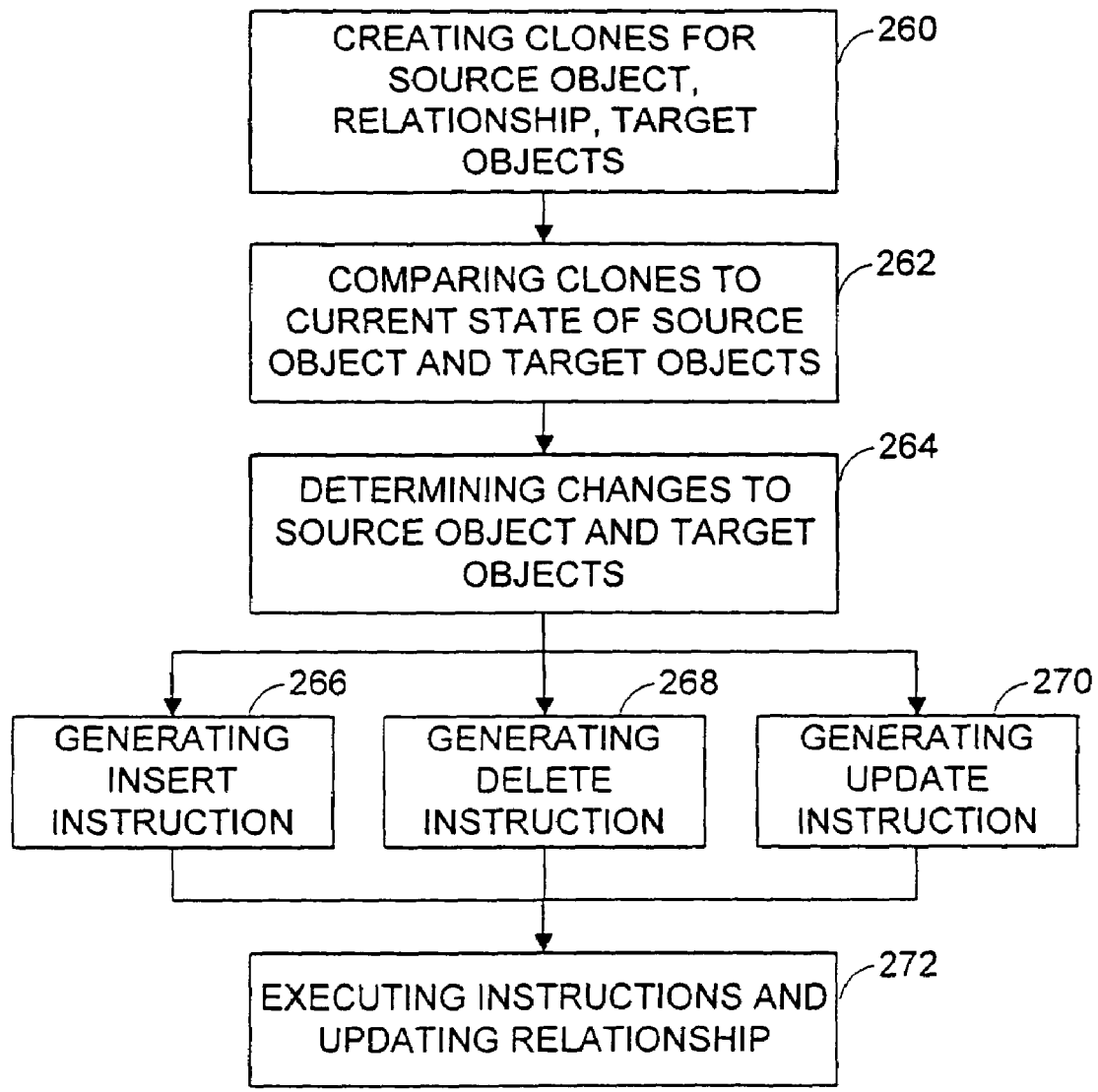
FIG. 9 is a flowchart showing a change track and update method.

Referring to FIG. 9, tracking changes and updating the relationship and target objects are now described.

Changes are traced in the context of a transaction through an object cloning mechanism. The mapping manager 120 uses the same mapping meta-data to determine which objects have been added, removed or changed in the relationship.

At the start of a transaction, the mapping manager 120 creates clones for the source object, the relationship and the target objects (260). When the transaction is committed i.e., the changes made during the transaction are loaded into the object model 10, the mapping manger 120 computes changes to the source and target objects through comparing the clones to the current state of the objects (262). For the target objects that do not store in-memory their full primary key from the database and thus have no unique identity, the comparison is carried out in the context of the source object, so that the target objects have the primary key of the source object and their additional primary key values are unique.

This comparison enables the added, removed and changed objects to be identified (264). The mapping manager 120 then, using the mapping meta-data, generates the appropriate insert, delete or update instructions for each of the target objects (266, 268, 270). For example, SQL Insert statements are generated for objects that have been added, SQL Delete statements are generated for objects that have been recoved, and SQL Upadate statements are generated for objects that have been changed.

The above embodiments are described using Java technology as an example of an object based technology and language. However, the applicability of the invention is not limited to Java or Java based technologies. The invention may be applied to other object-based languages and technologies, such as those developed by Microsoft Corporation or Hewlett Packard, with or without appropriate modification as necessary or desired, and such application is within the scope of the invention.

Similarly, while the above embodiments are described using SQL as an example of a query language, the invention is not limited to technologies based on or SQL or employing SQL. The invention may be applied incorporating other database query languages with or without appropriate modification as necessary or desired, and such application is still within the scope of the invention.

The mapping managing system of the present invention may be implemented by any hardware, software or a combination of hardware and software having the above described functions. The hardware may be a general purpose computer, or a part of a general purpose computer. The software code, either in its entirety or a part thereof, may be stored in a computer readabel memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A computer implemented method for managing object to relational one-to-many mapping for an object model mapped to a relational database, the method comprising a step of tracking changes to relationships and target objects with which a source object has one-to-many relationships of privately owned type, wherein the tracking step comprises steps of:

creating, at the start of a transaction, a source clone of the source object having a primary key value, a relationship clone of a relationship in the source object, and a target clone of target objects referenced by the relationship;

retrieving mapping meta-data stored in meta-data storage via a runtime mapping library which includes a set of predefined generic mapping objects and a reflection mechanism, wherein the reflection mechanism uses the mapping meta-data to instantiate an instance from a descriptor's class and iterate over descriptor's mappings to allow each mapping to set, load and transform rows from corresponding target tables into the target objects, and wherein the reflection mechanism is non-intrusive to the object model;

determining, when the transaction is committed, changes to the source object and target objects by comparing the source clone to a current state of the source object, and comparing the target clone to a current state of the target objects using the primary key value of the source object added to the target objects;

updating the relationship between the source object and the target objects by:

determining which objects have been added, removed or changed in the relationship by examining the mapping meta-data including information of corresponding source table, one or more target tables and foreign keys of the target tables, generating an INSERT instruction for each target object of a source target that has been added, generating a DELETE instruction for each target object of a source target that has been removed, and generating an UPDATE instruction for each target object of a source target that has been changed; and producing and storing a new database that results from updating the relationship between the source object and the target objects.

2. The computer implemented method as claimed in claim 1, wherein the steps of generating an insert, delete and update instructions comprise steps of:

generating SQL Insert statements for objects that have been added;

generating SQL Delete statements for objects that have been removed; and generating SQL Update statements for objects that have been changed.

3. The computer implemented method as claimed in claim 1 further comprising a step of:

storing the mapping meta-data external to a source object class and target object classes.

4. The computer implemented method as claimed in claim 3, wherein the storing step stores the mapping meta-data as XML files.

5. A one-to-many mapping manager system for managing object to relational one-to-many mapping for an object model mapped to a relational database, the system comprising:

a computer-readable memory storing mapping meta-data;

a runtime mapping library storing a set of predefined generic mapping objects and a reflection mechanism, wherein the reflection mechanism uses the mapping meta-data to instantiate an instance from a descriptor's class and iterate over descriptor's mappings to allow each mapping to set, load and transform rows from corresponding target tables into target objects, and wherein the reflection mechanism is non-intrusive to the object model;

a meta-data receiver for obtaining, for a source object having a primary key value and being manipulated, the mapping meta-data including information of one or more corresponding target tables for storing multiple target objects with which the source object has one-to-many relationships of privately owned type and information of one or more foreign keys of the one or more corresponding target tables;

an instruction generator for generating instructions to manage the multiple target objects and the relationships based on the mapping meta-data, wherein the instruction generator generates update instructions to track changes to the multiple target objects and the relationships, and to update the database when the source object is changed in the database, wherein the tracking changes comprises creating, at the start of a transaction, a source clone of the source object having a primary key value, a relationship clone of the relationships in the source object, and a target clone of the multiple target objects referenced by the relationships; and determining, when the transaction is committed, changes to the source object and the multiple target objects by comparing the source clone to a current state of the source object, and comparing the target clone to a current state of the multiple target objects using the primary key value of the source object added to the multiple target objects; and an instruction executor for executing the instructions on the relational database and managing the multiple target objects and the relationships in the database in accordance with the manipulation of the source object.

6. The manager system as claimed in claim 5, wherein the instruction generator having an insert instruction generator of generating insert instructions to insert the multiple target objects into the one or more corresponding target tables based on the mapping meta-data when the source object is inserted into the database.

7. The manager system as claimed in claim 6, wherein the insert instruction generating function includes:

a representation builder for building a database row representation for each target object; and a primary key information adder for adding the primary key value of the source object to the database row representation.

8. The manager system as claimed in claim 6, wherein the instruction generator generates the insert instructions as SQL Insert statements.

9. The manager system as claimed in claim 5, wherein the instruction generator having a read instruction generator for generating read instructions to read the multiple target objects and the relationships from the one or more corresponding target tables and foreign key values based on the mapping meta-data when the source object is read from the database.

10. The manager system as claimed in claim 9, wherein the instruction generator generates the read instructions as SQL Select statements.

11. The manager system as claimed in claim 5, wherein the instruction generator having a delete instruction generator for generating delete instructions to delete the multiple target objects and the relationships from the one or more corresponding target tables and foreign key values based on the mapping meta-data when the source object is deleted from the database.

12. The manager system as claimed in claim 11, wherein the instruction generator generates the delete instructions as SQL Delete statements.

13. The manager system as claimed in claim 5, wherein the instruction generator generates the instructions as SQL Insert statements, SQL Delete statements or SQL Update statements depending on a change to the source object.

14. A computer-readable memory storing instructions that when executed by a computer cause the computer to perform a method for managing object to relational one-to-many mapping for an object model mapped to a relational database, the method comprising a step of tracking changes to relationships and target objects with which a source object has one-to-many relationships of privately owned type, wherein the tracking step comprises steps of:

creating, at the start of a transaction, a source clone of the source object having a primary key value, a relationship clone of a relationship in the source object, and a target clone of target objects referenced by the relationship;

retrieving mapping meta-data stored in meta-data storage via a runtime mapping library which includes a set of predefined generic mapping objects and a reflection mechanism, wherein the reflection mechanism uses the mapping meta-data to instantiate an instance from a descriptor's class and iterate over descriptor's mappings to allow each mapping to set, load and transform rows from corresponding target tables into the target objects, and wherein the reflection mechanism is non-intrusive to the object model;

determining, when the transaction is committed, changes to the source object and target objects by comparing the source clone to a current state of the source object, and comparing the target clone to a current state of the target objects using the primary key value of the source object added to the target objects;

updating the relationship between the source object and the target objects by:

determining which objects have been added, removed or changed in the relationship by examining the mapping meta-data including information of corresponding source table, one or more target tables and foreign keys of the target tables, generating an INSERT instruction for each target object of a source target that has been added, generating a DELETE instruction for each target object of a source target that has been removed, and generating an UPDATE instruction for each target object of a source target that has been changed; and producing and storing a new database that results from updating the relationship between the source object and the target objects.

15. The computer-readable memory as claimed in claim 14, wherein the steps of generating an insert, delete and update instructions comprise steps of:

generating SQL Insert statements for objects that have been added;

generating SQL Delete statements for objects that have been removed; and generating SQL Update statements for objects that have been changed.

16. The computer-readable memory as claimed in claim 14 further comprising a step of:

storing the mapping meta-data external to a source object class and target object classes.

17. The computer-readable memory as claimed in claim 16, wherein the storing step stores the mapping meta-data as XML files.

* * * * *

UNITED STATES PATENT AND TRADEMARK OFFICE
CERTIFICATE OF CORRECTION

PATENT NO. : 7,383,273 B2  Page 1 of 1
APPLICATION NO. : 11/062014
DATED : June 3, 2008
INVENTOR(S) : Wang et al.

It is certified that error appears in the above-identified patent and that said Letters Patent is hereby corrected as shown below:

In column 4, line 5, delete "one-to-may" and insert -- one-to-many --, therefor.

In column 4, line 59, after "Phone#" delete "14" and insert -- 16 --, therefor.

In column 4, line 62, after "Phone#" delete "14." and insert -- 16. --, therefor.

In column 4, line 65, after "Phone#" delete "14" and insert -- 16 --, therefor.

In column 5, line 1, after "Phone#" delete "14" and insert -- 16 --, therefor.

In column 9, line 51, delete "recoved," and insert -- removed, --, therefor.

In column 9, line 52, delete "Upadate" and insert -- Update --, therefor.

In column 10, line 9, delete "readabel" and insert -- readable --, therefor.

Signed and Sealed this

Seventh Day of July, 2009

JOHN DOLL
*Acting Director of the United States Patent and Trademark Office*